(12) United States Patent
Rodriguez Najera et al.

(10) Patent No.: US 9,831,643 B2
(45) Date of Patent: Nov. 28, 2017

(54) CURRENT TRANSFORMER RETAINERS FOR ENCLOSURE KNOCK OUTS

(71) Applicant: SCHNEIDER ELECTRIC USA, INC., Schaumburg (IL)

(72) Inventors: Gerardo Rodriguez Najera, San Nicolas de los Garza (MX); Cristina Rosas Salazar, Torreon (MX)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 0 days.

(21) Appl. No.: 15/032,787

(22) PCT Filed: Nov. 26, 2013

(86) PCT No.: PCT/US2013/072056
§ 371 (c)(1),
(2) Date: Apr. 28, 2016

(87) PCT Pub. No.: WO2015/080708
PCT Pub. Date: Jun. 4, 2015

(65) Prior Publication Data
US 2016/0254652 A1 Sep. 1, 2016

(51) Int. Cl.
*H02B 1/32* (2006.01)
*H02B 1/30* (2006.01)
*H01F 27/06* (2006.01)
*H01F 27/02* (2006.01)

(52) U.S. Cl.
CPC ............. *H02B 1/32* (2013.01); *H01F 27/02* (2013.01); *H01F 27/06* (2013.01); *H02B 1/305* (2013.01)

(58) Field of Classification Search
CPC ... H02B 1/32; H02B 1/305; H01F 27/02; H01F 27/06
USPC ........................................... 174/545
See application file for complete search history.

(56) References Cited

U.S. PATENT DOCUMENTS

| | | | |
|---|---|---|---|
| 4,321,576 A * | 3/1982 | Lien | H01H 9/30 337/202 |
| 4,602,122 A | 7/1986 | Lint | |
| 5,067,917 A * | 11/1991 | Howard | H01F 27/027 336/192 |
| 6,081,180 A | 6/2000 | Fernandez et al. | |
| 6,459,042 B1 | 10/2002 | Stilianos et al. | |
| 7,857,668 B2 * | 12/2010 | Henderson | H01G 2/06 439/500 |

(Continued)

OTHER PUBLICATIONS

International Search Report and Written Opinion dated Apr. 14, 2014 for PCT/US2013/072056, 15pp.

*Primary Examiner* — Timothy Thompson
*Assistant Examiner* — Charles Pizzuto
(74) *Attorney, Agent, or Firm* — Locke Lord LLP

(57) ABSTRACT

Current transformer (CT) retainers (100, 200, 300, 400) are disclosed for use in an electrical enclosure (510) for an electrical panel (500). An exemplary CT retainer includes a body that has one end portion (110, 210, 410) configured to mount onto a wall (140) of the electrical enclosure. The body of the CT retainer also includes an opposite end portion with a basket (150, 250, 350, 450) for housing a CT. The basket includes a flexible clip (160 and 180, 260 and 280, 360 and 380, or 470) which is configured to flex to allow insertion of the CT into the basket or removal of the CT from the basket.

16 Claims, 5 Drawing Sheets

(56) References Cited

U.S. PATENT DOCUMENTS

| | | | |
|---|---|---|---|
| 7,898,822 B2 * | 3/2011 | Feist | H01F 27/027 |
| | | | 336/65 |
| 2008/0007703 A1 * | 1/2008 | Menard | G03B 21/145 |
| | | | 353/119 |
| 2012/0270449 A1 * | 10/2012 | Doorhy | H01R 13/6463 |
| | | | 439/676 |

* cited by examiner

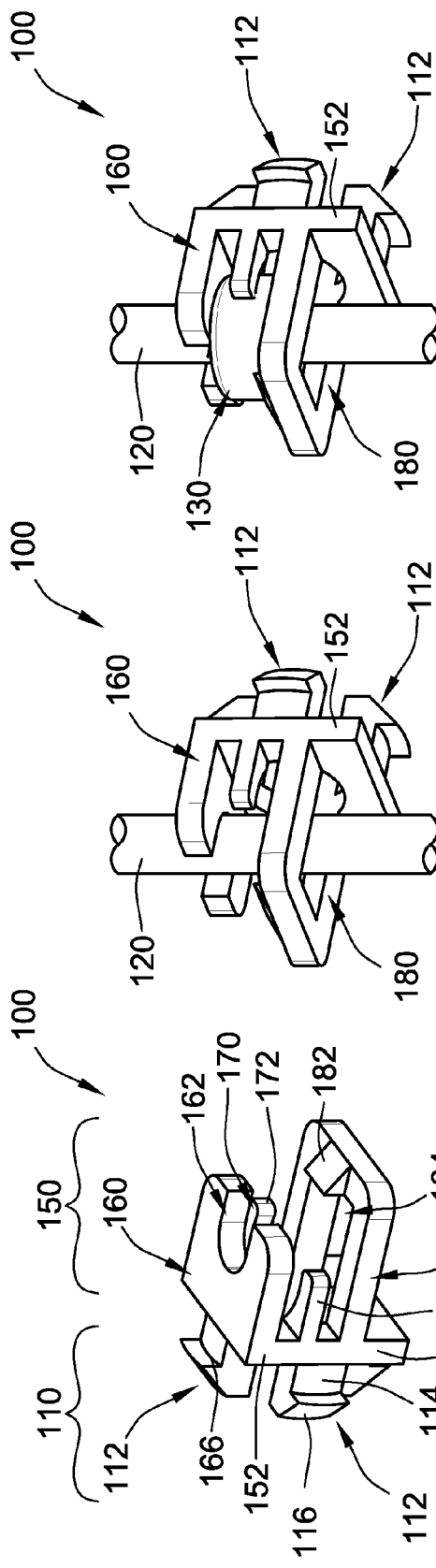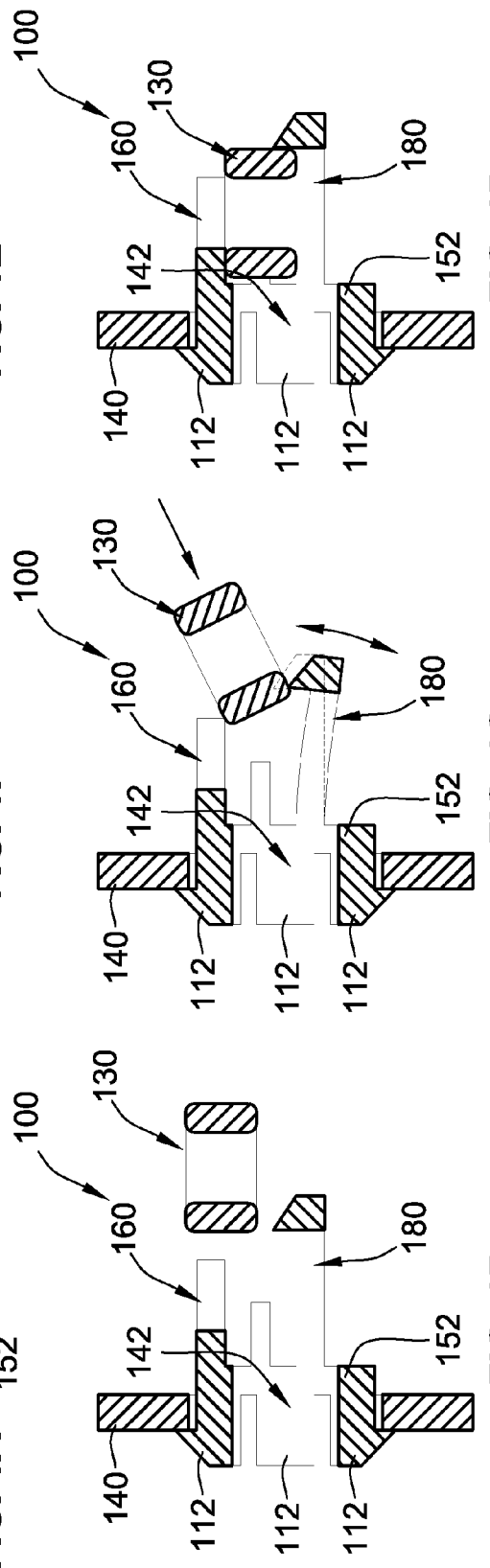

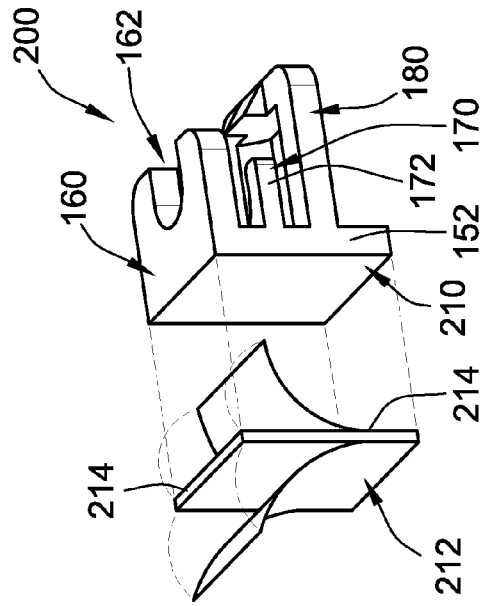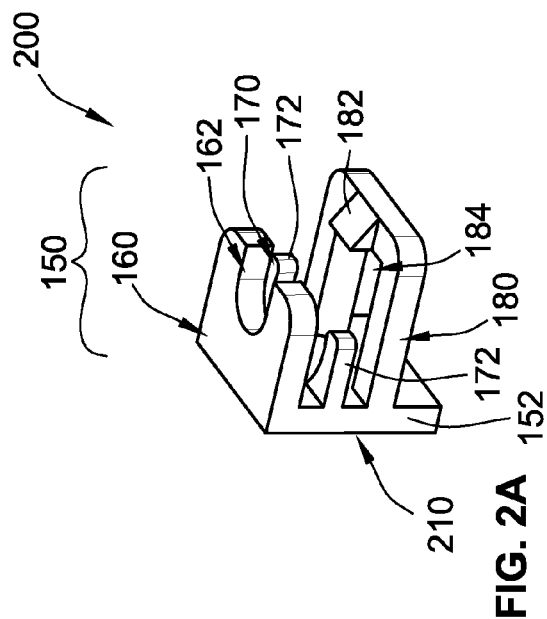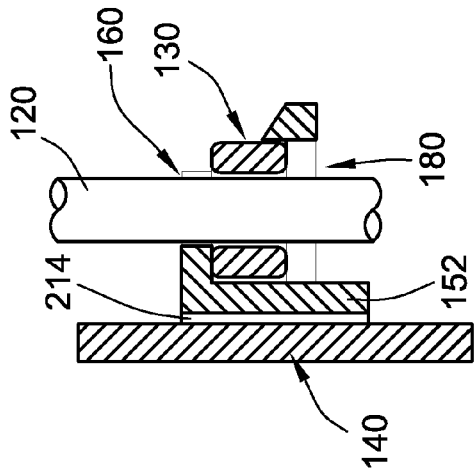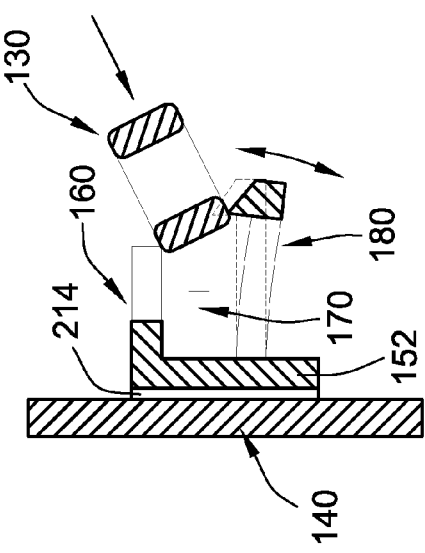

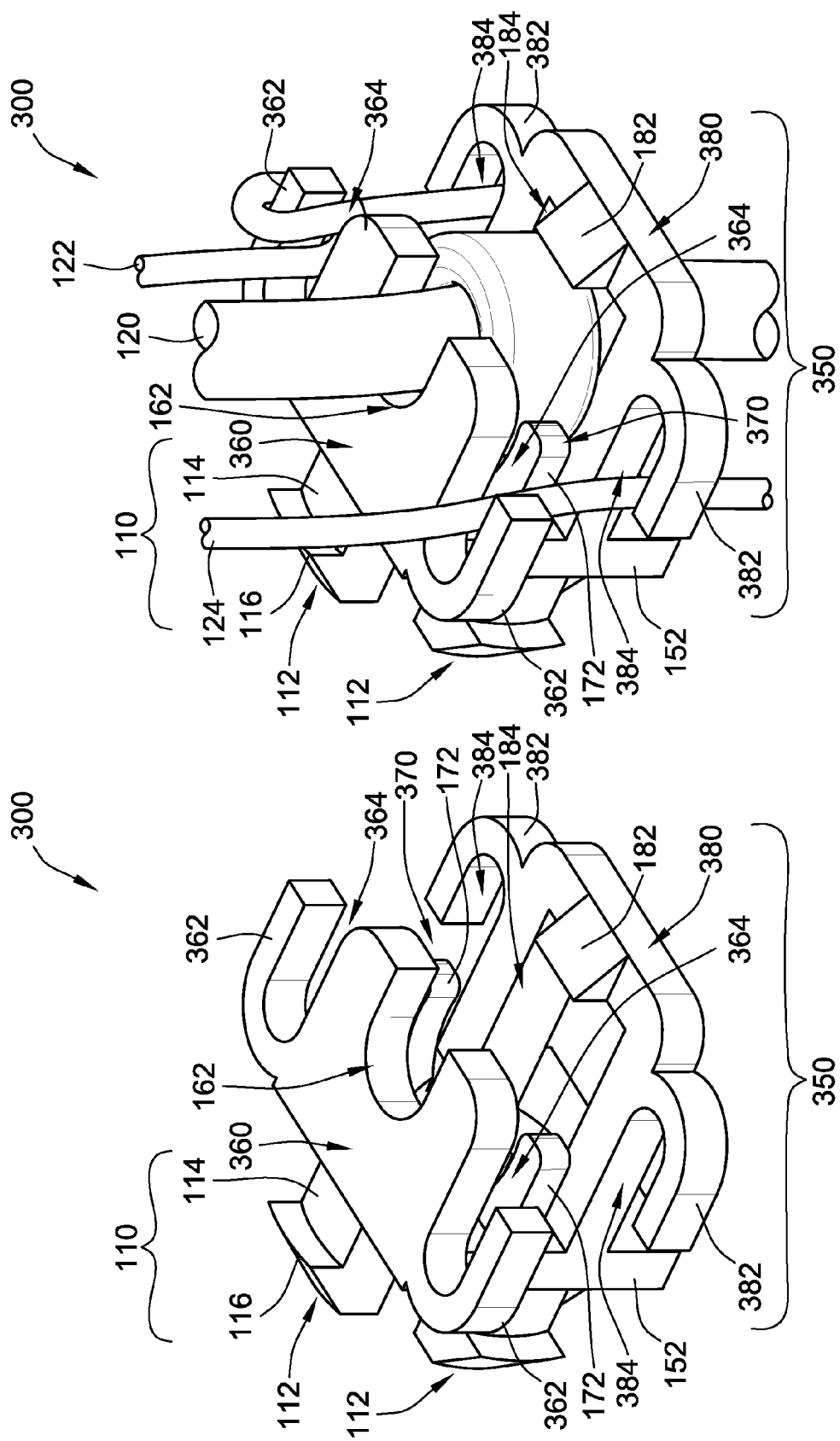

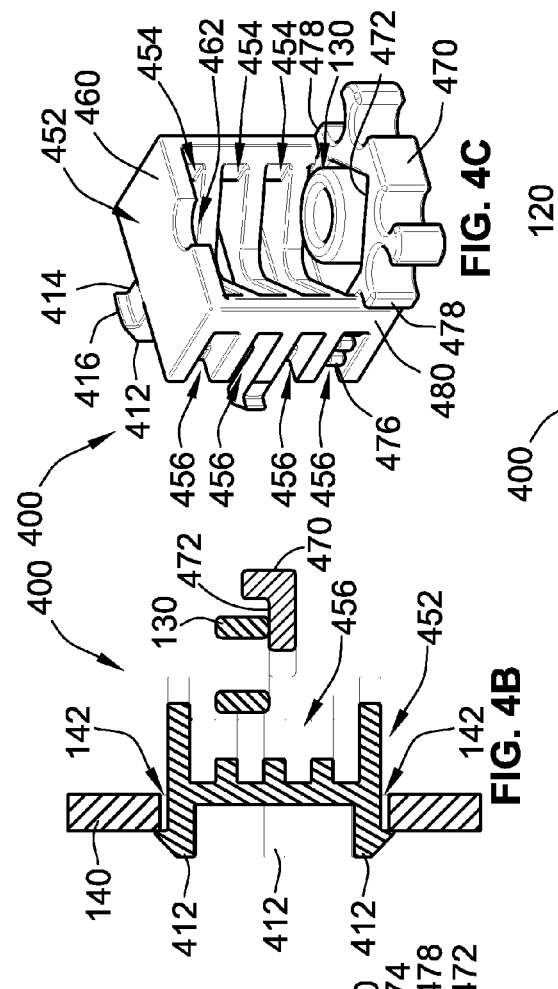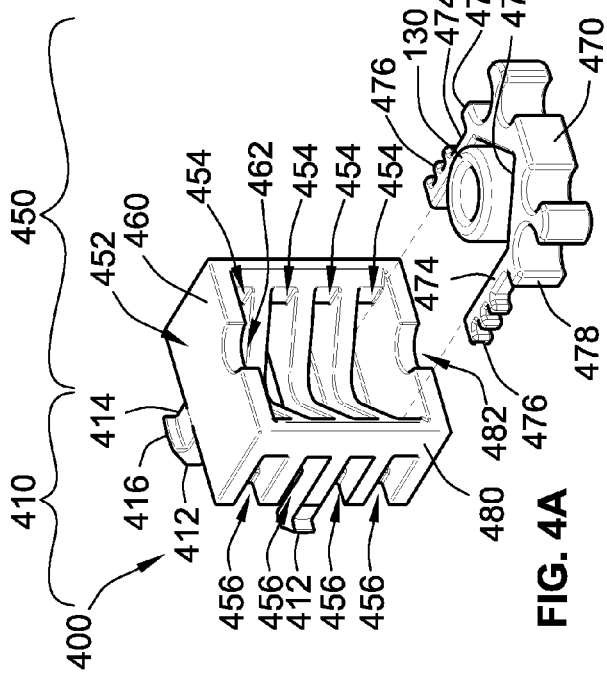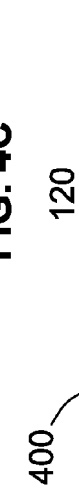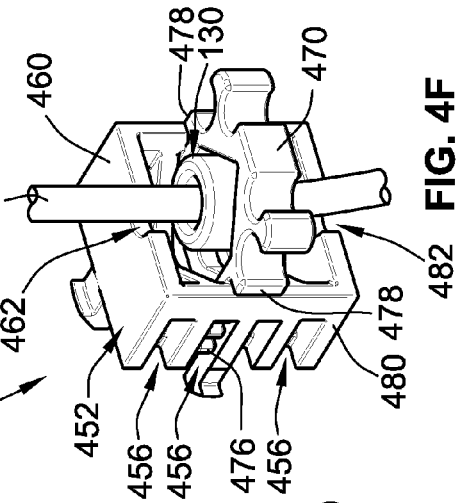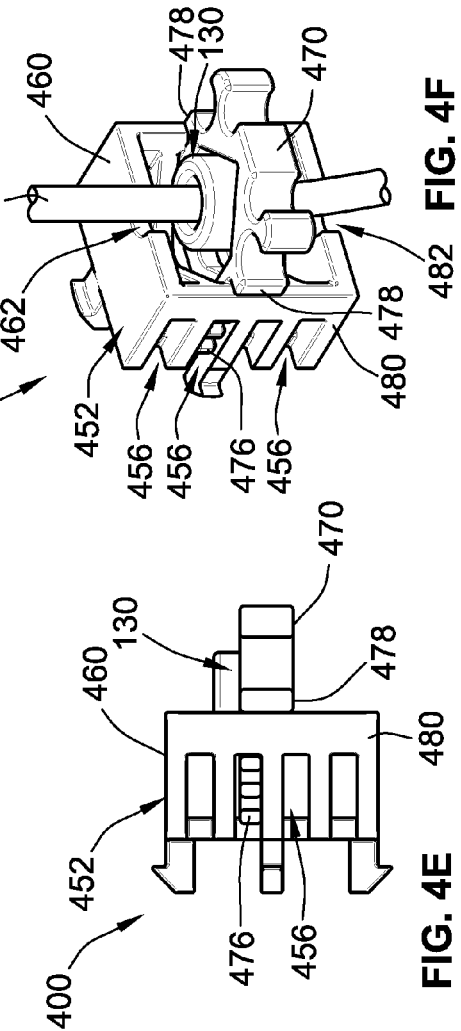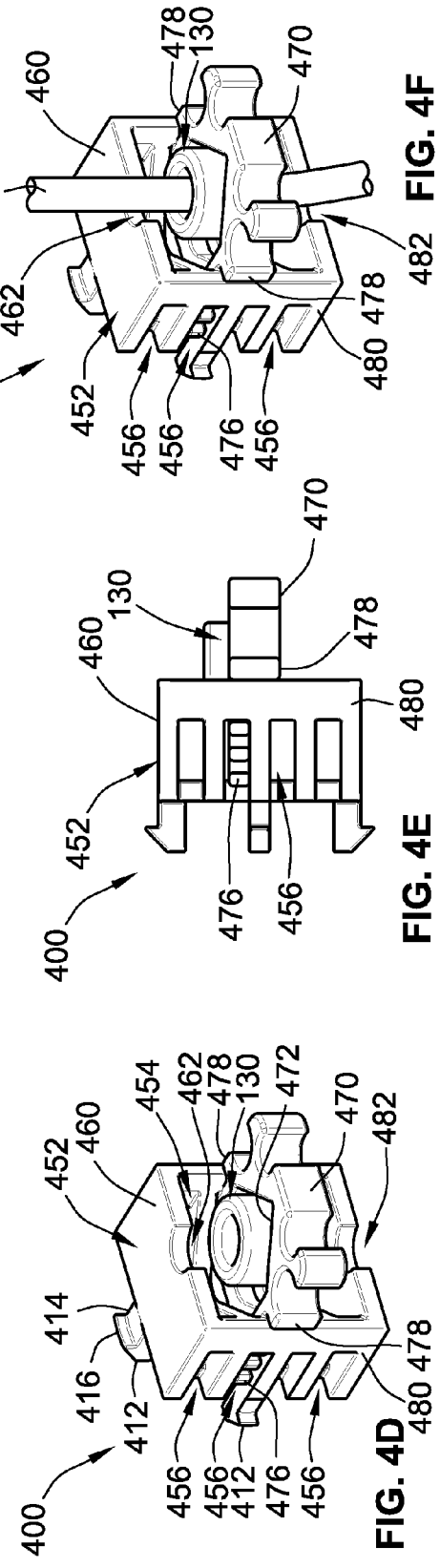

CURRENT TRANSFORMER RETAINERS FOR ENCLOSURE KNOCK OUTS

FIELD

The present disclosure relates to the field of electrical enclosures, and more particularly, to a current transformer retainer for use with an electrical enclosure for an electrical panel.

BACKGROUND

Current Transformers (CTs) may be used as part of a smart home system to monitor energy usage in a home or other facility. For example, CTs can be used at an electrical panel, such as a panelboard (also referred to in residential markets as a "load center"), to monitor energy consumption of branch circuits or their loads. In practice, a CT is placed around a portion of an electrical cable to be monitored and creates a magnetic field which is used to monitor energy consumption on the cable. Typically, CTs hang freely along with the monitored cables and other cables in an electrical enclosure for an electrical panel. As a consequence, a user may have difficulty identifying particular CTs and cables in the electrical enclosure and wiring in the limited confines of the panelboard may be problematic.

SUMMARY

To address these and other shortcomings, current transformer (CT) retainers are disclosed for use in an electrical enclosure for an electrical panel. An exemplary CT retainer includes a body that has one end portion configured to mount onto a wall of the electrical enclosure. The body of the CT retainer also includes an opposite end portion with a basket for housing a current transformer. The basket includes a flexible clip which is configured to flex to allow insertion of the current transformer into the basket or removal of the current transformer from the basket. The CT retainer can be mounted on a wall of the electrical enclosure and used to retain a current transformer and a portion of the monitored conductor (also sometimes referred to as "cable" or "wire") in an organized manner to provide for better space management (e.g., space savings) in the enclosure. Accordingly, the current transformers and cables do not need to hang freely in the electrical enclosure. The CT retainer can also be labeled to better identify the monitored cables. The CT retainer also maintains a gap between the wall of the electrical enclosure and the monitored cable.

Furthermore, the disclosed CT retainer can be easily retrofitted onto a wall of an electrical enclosure, via an unused knock out (KO), e.g., a section, often pre-weakened, that can be knocked out to provide an opening on the electrical enclosure or via an available surface on a wall of the electrical enclosure. For example, in various embodiments, the one end portion of a CT retainer can include a snap-type mounting assembly, which can take advantage of an unused KO to mount the CT retainer onto the electrical enclosure via an opening of the unused KO. In other embodiments, the CT retainer can have an adhesive on the one end portion of the CT retainer, which is used to mount the CT retainer onto an available surface on a wall of the electrical enclosure.

In one embodiment of the CT retainer, the basket of the CT retainer includes a flexible clip that can have a top portion, a middle portion and a bottom portion which are connected to a spine. When a current transformer is housed in the basket, the top portion is arranged above a top of the current transformer. The middle portion has a pair of extending arms arranged on opposite sides of the current transformer. The bottom portion supports and is arranged below a bottom of the current transformer. An end of the top portion or the bottom portion or both may include a hook configured to engage a side or portion of the current transformer to retain the current transformer in the basket. One or more of the elements of the flexible clip can be formed of a flexible or resilient material, such as the bottom portion or the spine, to facilitate insertion of the current transformer into the basket and removal of the current transformer from the basket.

In addition to the monitored cables, the electrical enclosure may also maintain other cables including the leads of the current transformers. Accordingly, in a further embodiment, the basket of the CT retainer can include a wire retainer, such as one or more extending cable retention arms, to retain or restrain the other cables (e.g., cables, wires or leads) not monitored by the retained current transformer. In one example, the CT retainer can retain or restrain a lead of the current transformer or other cables by wrapping or looping a portion of them around one or more of the extending cable retention arms. The extending cable retention arm of a wire retainer may have a bent shape, which forms a groove to retain and guide a portion of the other cables.

Furthermore, the CT retainer can be configured to hold different sizes of current transformers. For example, in another embodiment of the CT retainer, the basket of the CT retainer includes a housing having a plurality or series of apertures arranged at different positions in the housing. Each of the apertures is configured to receive a flexible clip. In this embodiment, the flexible clip includes a base portion for supporting a current transformer and two opposing flexible cantilever arms which are configured to be arranged on opposing sides of the current transformer. The two flexible cantilever arms are configured to snap into the housing when received in the aperture. For example, the two flexible cantilever arms engage or extend through corresponding slots on opposing side walls of the housing when the flexible clip is received in the aperture along with the current transformer thereon. A different one of the apertures on the housing can be used for different current transformer sizes, for example, a top aperture for a small current transformer (e.g., a half inch CT) and a bottom aperture for a larger current transformer (e.g., one inch CT).

BRIEF DESCRIPTION OF THE DRAWINGS

The description of the various exemplary embodiments is explained in conjunction with the appended drawings, in which:

FIGS. 1A, 1B, 1C, 1D, 1E and 1F illustrate different views of an exemplary CT retainer, in accordance with a first embodiment of the present disclosure.

FIGS. 2A, 2B, 2C, 2D and 2E illustrate different views of an exemplary CT retainer, in accordance with a second embodiment of the present disclosure.

FIGS. 3A and 3B illustrate different perspective views of an exemplary CT retainer, in accordance with a third embodiment of the present disclosure.

FIGS. 4A, 4B, 4C, 4D, 4E and 4F illustrate different views of an exemplary CT retainer, in accordance with a fourth embodiment of the present disclosure.

DETAILED DESCRIPTION

Figure 5:
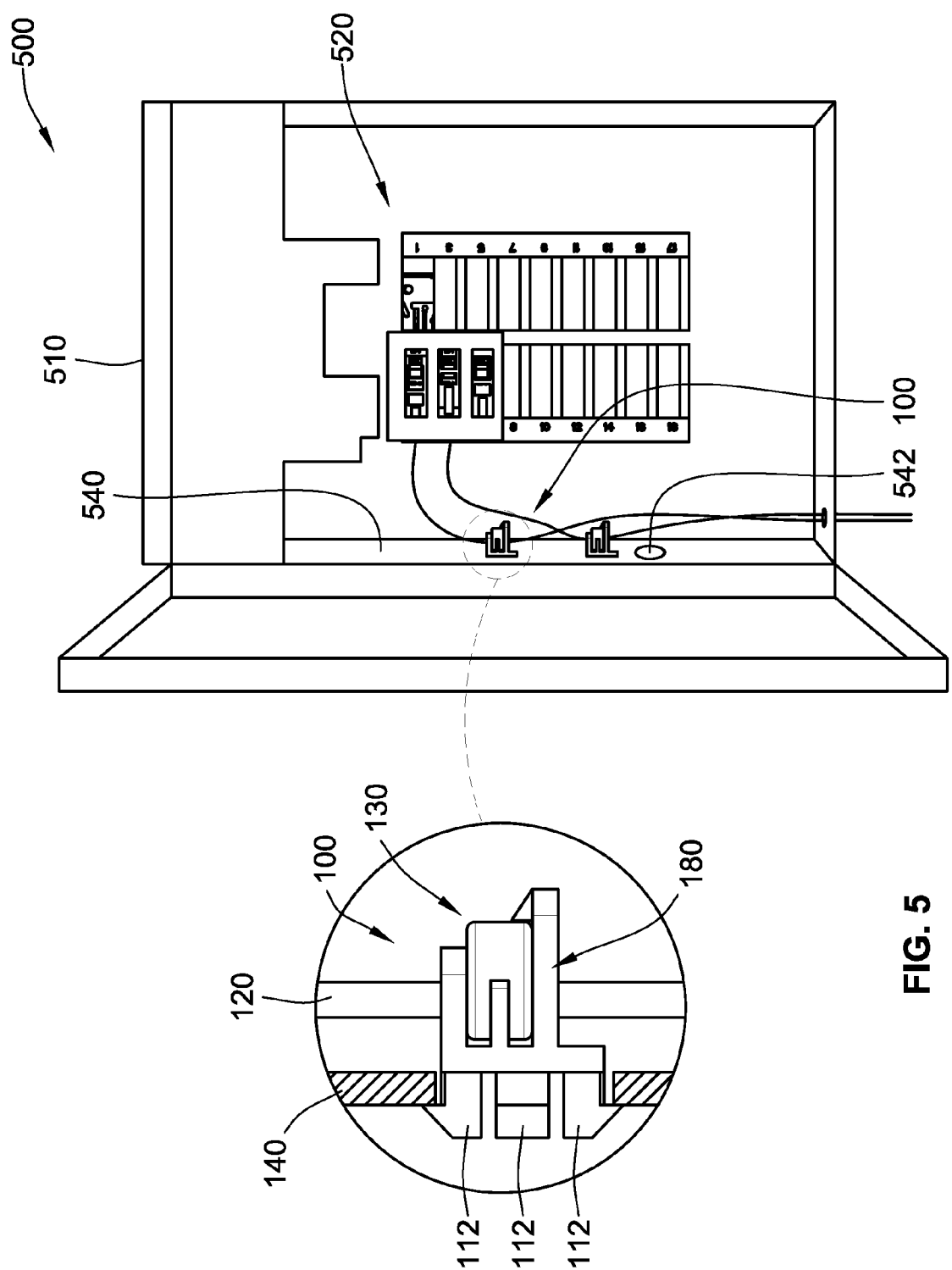
FIG. 5 illustrates an electrical panel, such as a panelboard, having an electrical enclosure with one or more CT retainers, such as shown in FIG. 1A, mounted thereon, in accordance with an embodiment.

Current transformer (CT) retainers are disclosed, which can be mounted on a wall of an electrical enclosure for an electrical panel, such as a panelboard, to retain or hold a current transformer. FIG. 1A illustrates a CT retainer 100 in accordance with a first embodiment of the present disclosure. The CT retainer 100 includes a body having an end portion 110 configured to be mounted onto a wall of an enclosure of an electrical panel, and an opposite end portion with a basket 150 for housing a current transformer. The end portion 110 includes a snap-type mounting assembly, such as a snap joint 112, for mounting the end portion 110 of the CT retainer into an opening 142 in a wall 140 of an electrical enclosure as shown in FIG. 1B. The snap joint 112 can include a plurality of resilient cantilevers 114. Each cantilever 114 includes a hook 116 at an end. The cantilevers 114 are configured to initially deflect as they are inserted through the opening 142 in the wall 140. As the hook 116 of the cantilevers 114 extends through the opening 142, the cantilevers 114 snap out with each cantilever 114 and its hook 116 together engaging a surface in and/or around the opening 142 of the wall 140 so that the CT retainer 100 is securely mounted on the wall 140. The opening 142 may be provided from a knock out (KO) on the wall 140 of an electrical enclosure.

As further shown in FIG. 1A, the basket 150 includes a top portion 160, a middle portion 170 and a bottom portion 180, which are connected to a spine 152. The top portion 160 includes a groove 162 for retaining and guiding a portion of a monitored cable, and provides a surface or area 166 for labeling the CT retainer 100 (e.g., the label "1"). The middle portion 170 includes a pair of extending arms 172. The bottom portion 180 includes a hook 182 and an opening 184 that also retains and guides a portion of a monitored cable therethrough. A number of these elements of the basket 150 may cooperate with each other to form a flexible clip that can flex or bend to allow insertion of a current transformer into the basket 150 or removal of a current transformer from the basket 150. For example, the flexible clip of the basket 150 may include the top portion 160, the middle portion 170, the bottom portion 180 and the spine 152 or a combination thereof to retain or hold a current transformer in the basket 150. Each of the elements of the flexible clip of the basket 150 may be a flexible element, which is formed of a flexible or resilient material, to flex or bend to allow insertion of a current transformer into the basket 150 or removal of a current transformer from the basket 150. As shown in FIG. 1C, the bottom portion 180 or the spine 152 may be a flexible element, which can be flexed or bent to insert a current transformer 130 into the basket 150 or to remove the current transformer 130 from the basket 150.

In FIG. 1D, the current transformer 130 is housed in the basket 150. For example, as shown, the top portion 160 is arranged above the top of the current transformer 130 to provide a ceiling to prevent movement of the current transformer 130 beyond the top portion 160. The top portion 160 may contact the top of the current transformer 130. The extending arms 172 of the middle portion 170 are arranged on opposite sides of the current transformer 130 to prevent lateral or side movement of the current transformer 130 beyond the extending arms 172. The extending arms 172 of the middle portion 170 may also contact respective sides of the current transformer 130. The bottom portion 180 is in contact with the bottom of the current transformer 130, and provides support for the current transformer 130. The bottom portion 180 is arranged below the current transformer 130 and provides a floor to prevent movement of the current transformer 130 beyond the bottom portion 180. When the current transformer is housed in the basket 150, the hook 182 on the bottom portion 180 engages a side or portion of the current transformer 130 to more securely retain the current transformer 130 in the basket 150. FIG. 1E shows the CT retainer 100 housing the current transformer 130, which is arranged to monitor an electrical cable 120 extending therethrough. The CT retainer 100 can also be used to simply maintain and organize cable(s), such as the cable 120, as shown in FIG. 1F.

FIGS. 2A, 2B, 2C, 2D and 2E illustrate different views of an exemplary CT retainer 200, in accordance with a second embodiment of the present disclosure. The CT retainer 200 is the same as the CT retainer 100 of FIG. 1A, except that the CT retainer 200 is mounted onto an available surface of a wall of an enclosure for an electrical panel using an adhesive.

As shown in FIG. 2A, the CT retainer 200 includes a body having an end portion 210 configured to be mounted onto a wall of an enclosure of an electrical panel, and an opposite end portion with a basket 150 for housing a current transformer. The end portion 210 includes an adhesive 214 which can be applied to the end portion 210 through a transfer paper 212, as shown in FIG. 2B. In FIG. 2C, the end portion 210 of the CT retainer 200 can be mounted onto an available surface on a wall 140 of an electrical enclosure, via the adhesive 214. As further shown in FIG. 2A, the basket 150 includes a top portion 160, a middle portion 170 and a bottom portion 180, which are connected across a spine 152. The components and operations of the basket 150 were previously discussed in greater detail above with respect to the CT retainer 100 in the first embodiment of the present disclosure. As shown in FIG. 2D, the bottom portion 180 or the spine 152 may be a flexible element, which can be flexed or bent to insert a current transformer 130 into the basket 150 or to remove the current transformer 130 from the basket 150. FIG. 2E shows the CT retainer 200 housing the current transformer 130 with the monitored electrical cable 120 having a portion of the cable arranged in the current transformer.

FIGS. 3A and 3B illustrate perspective views of an exemplary CT retainer 300, in accordance with a third embodiment of the present disclosure. The CT retainer 300 is the same as the CT retainer 100 of the first embodiment (see e.g., FIG. 1A), except that the CT retainer 300 includes one or more wire retainers on a top portion and a bottom portion of the basket. The wire retainers can be used to retain or hold a portion of a cable, such as a lead of a current transformer or any other cables (e.g., cables, wires and leads) maintained in an electrical enclosure.

As shown in FIG. 3A, the CT retainer 300 includes an end portion 110 with a snap-type mounting, such as a snap joint 112, for mounting the end portion 110 of the CT retainer 300 into an opening in a wall of an electrical enclosure. Other mounting systems can also be used including the use of an adhesive, such as previously discussed above with respect to the second embodiment (see e.g., FIG. 2B). The CT retainer 300 also includes a basket 350 having a spine 152 as well as a top portion 360, a middle portion 370 and a bottom portion 380. The top, middle and bottom portions 360, 370 and 380 are the same as the portions 160, 170 and 180, respectively, of the basket 150 of the first and second embodiments, except that the top portion 360 and the bottom portion 380 of the basket 350 also include wire retainers 362 and 382, respectively, on each side. As with the basket 150 of the first embodiment, the basket 350 similarly has a flexible clip that may include the top portion 360, the middle portion 370, the bottom portion 380 and the spine 152 or a combination thereof to retain or hold a current transformer in the basket 350. Each of the elements of the flexible clip of the basket 350 may be formed of a flexible or resilient material to flex or bend to allow insertion of a current transformer from the basket 350 or removal of a current transformer from the basket 350.

The wire retainer 362 may have a bent-shaped extending cable retention arm that extends away from the spine 152 and forms a groove 364 to retain or hold a portion of a cable (e.g., a cable, wire or lead). Each side of the bottom portion 380 also includes a wire retainer 382 with a bent-shaped extending cable retention arm that extends toward the spine 152 and forms a groove 384 to retain or hold a portion of a cable. On each side of the basket 350, the wire retainer 362 and the wire retainer 382 extend in opposite directions, and provide a gap therebetween to allow a portion of a cable to be inserted into the grooves 364 and 384 of the basket 350 or removed from the grooves.

FIG. 3B shows the CT retainer 300 retaining or holding a current transformer 130 in the basket 350 with a portion of a cable 120, which is monitored by the current transformer 130, arranged in the groove 164 of the top portion 360 and another portion of the cable 120 extending through the opening 184 of the bottom portion 380. One or more cables, such as a cable 124 or a lead 122 of the current transformer 130, can be arranged in any of the grooves provided by the wire retainers 362 and 382 to retain them in an organized fashion in an electrical enclosure. For example, a portion of a cable can be slipped through a gap between the arms of the wire retainers 362 and 382 on one side of the basket 350 and into the corresponding grooves 364 and 384. The cable retention arms of the wire retainers 362 and 382 may also be a flexible element, which is formed of a flexible or resilient material, to further facilitate the insertion of cables into the basket 350 or the removal of cables from the basket 350. Furthermore, to better retain or hold a portion of a cable(s) in the basket 350 of the CT retainer 300, the cable can also have a portion wrapped (or looped) around an arm of a wire retainer, such as the CT lead 122 having a portion wrapped around the wire retainer 362 (as shown).

FIGS. 4A, 4B, 4C, 4D, 4E and 4F illustrate different views of an exemplary CT retainer 400, in accordance with a fourth embodiment of the present disclosure. As shown in FIG. 4A, the CT retainer 400 includes a body having an end portion 410 configured to be mounted onto a wall of an enclosure of an electrical panel, and an opposite end portion with a basket 450 for housing a current transformer. The end portion 410 includes a snap-type mounting assembly, such as a snap joint 412, for mounting the end portion 410 of the CT retainer 400 into an opening 142 in a wall 140 of an electrical enclosure as shown in FIG. 4B. For example, the snap joint 412 can include a plurality of resilient cantilevers 414 having a hook 416 at an end. The resilient cantilevers 414 are configured to initially deflect as they are inserted through the opening 142 and to snap out and engage the wall 140 via the opening. The opening 142 may be provided through a knock out (KO) on the wall 140 of the electrical enclosure. The snap joint 412 is the same as the snap joint 112 of the CT retainer 100 of the first embodiment, which is described in detail above.

As further shown in FIG. 4A, the basket 450 includes a flexible clip 470 and a housing 452 having a top portion 460, a bottom portion 480 and a plurality or series of apertures 454 for receiving the flexible clip 470 at different positions in the housing 452. The top portion 460 may include a groove 462 to retain and guide a portion of a cable monitored by a current transformer 130 (see e.g., cable 120 in FIG. 4F). The bottom portion 480 may also include a groove 482 to retain and guide another portion of the monitored cable.

The flexible clip 470 includes a base portion 472, a pair of flexible cantilever arms 474 and a stop(s) 478. The base portion 472 provides support for the current transformer 130. Each flexible cantilever arm 474 includes one or more fingers 476, and can be formed of a flexible or resilient material. In operation, the current transformer 130 can be placed onto the base portion 472 of the flexible clip 470 between the two flexible cantilever arms 474. The flexible clip 470 can then be inserted into a selected aperture from the plurality of apertures 454 of the housing 452. As the flexible clip 470 is inserted into the selected aperture, the flexible cantilever arms 474 deflect inwards and then snap outwards with the fingers 476 engaging slots 456 on respective side walls of the housing 452 as shown in FIGS. 4C, 4D and 4E. Furthermore, in FIG. 4D, the stops 478 on each side of the flexible clip 470 contact or abut against a surface of the housing 452 to prevent further movement of the flexible clip 470 into the housing 452. To remove the current transformer 130, a user can squeeze the flexible cantilever arms 474 of the flexible clip 470 inwards so the fingers 476 of each flexible cantilever arm 474 disengage from a respective slot 456 on the housing 452. The user can then withdraw the flexible clip 470 along with the current transformer 130 from the housing 452 to a detached position, as shown in FIG. 4A. Thus, in this example, the flexible clip 470 can be detachably engaged or connected to the housing 452, via an aperture 454.

The base portion 472 of the flexible clip 470 may also be a flexible element, which is formed of a flexible or resilient material. Similar to the bottom portion 180 of the CT retainer 100 (discussed above), the base portion 472 can be bent or flexed to allow insertion of the current transformer 130 into the basket 450 or removal of the current transformer 130 from the basket, even when the flexible clip 470 is engaged in an aperture 454 of the housing 452. Similarly, the housing 452 may also include flexible elements, such as the top portion 460 or the side or back walls of the housing, to facilitate insertion of the flexible clip 470 into the housing 452 or removal or the flexible clip 470 from the housing 452.

The CT retainer 400 can be used to retain or hold current transformers of different sizes and shapes. For example, depending on the size or shape of the current transformer to be retained, the flexible clip 470 can be engaged to a suitable aperture 454 from the plurality of apertures 454 in the housing 452. The flexible clip 470 can be engaged to a lower positioned aperture 454 in the housing 452, such as shown in FIG. 4C, for a larger sized current transformer (e.g., one inch CT) or a taller current transformer. The flexible clip 470 can be engaged to a higher positioned aperture 454 in the housing 452, such as shown in FIG. 4D, for a smaller sized current transformer (e.g., half inch CT) or a shorter current transformer.

FIG. 4F shows the CT retainer 400 housing the current transformer 130, which is arranged to monitor the cable 120. A portion of the cable 120 is arranged in the groove 462 of the top portion 460 of the housing 452, and another portion of the cable 120 is arranged in the groove 482 of the bottom portion 480 of the housing 452.

The CT retainer 400 may also include a wire retainer, such as a wire retainer 362 or 382 in FIGS. 3A and 3B (discussed above), which can be connected to or can extend from a side of the housing 452. Furthermore, instead of a snap-type mounting assembly, the CT retainer 400 may be mounted onto a surface of a wall of an electrical enclosure using an adhesive such as discussed above with respect to the CT retainer 200 of FIG. 2B in the second embodiment of the present disclosure.

FIG. 5 illustrates an electrical panel 500, such as a panelboard, that includes a plurality of electrical devices 520 (e.g., switching devices, circuit breakers, etc.) and an electrical enclosure 510 with one or more of CT retainers mounted thereon. For the purpose of explanation, the CT retainer can be the CT retainer 100 of FIG. 1D. The CT retainer 100 may be mounted onto a wall 540 of the enclosure 510, such as through an opening from a knock out from a plurality of knockouts 542, which may be provided throughout the enclosure 510. In this example, the CT retainer 100 is mounted onto an interior side of the wall 540. The CT retainer 100 also maintains a gap between the wall 540 of the electrical enclosure 520 and the monitored cable 120, or other cables if the CT retainer also includes a wire retainer (see e.g., CT retainer 300). As shown, through the use of the CT retainers such as disclosed herein, it is possible to organize the current transformers 130 and their monitored cables 120 from the electrical devices 520 in an orderly fashion in the electrical enclosure 510 to save space. The use of the CT retainers also provides an environment that is better suited for wiring in the enclosure 510, for example, in the limited confines of an enclosure for a panelboard. The CT retainers may be labeled, as previously discussed, to identify a retained or held current transformer, monitored cable or other cables or to identify the electrical device, load or circuit being monitored by the retained current transformer.

The disclosed embodiments of the CT retainer are simply provided as examples. The size and shape of the basket of the CT retainers can be modified accordingly to retain or hold current transformers of different sizes and shapes than those described and shown in the present disclosure. The CT retainers can be formed of a dielectric material, plastic or any suitable material depending on the application. In the first, second and third embodiments, the top portion and the extending arms of the middle portion of the basket may also include a hook, similar to the hook (e.g., 182) of the bottom portion, to more securely retain a current transformer in the basket of the CT retainer. In addition, the top portion and the bottom portion may include a groove (e.g., 162) or an opening (e.g., 184) to retain and guide a portion of a monitored cable.

Furthermore, when mounting the CT retainers in an enclosure, a CT retainer can be oriented in different directions depending on the availability of space in the electrical enclosure. For example, the CT retainers may be mounted upside down or in any other orientation to retain or hold a current transformer as well as other cables if the CT retainer also includes a wire retainer.

While particular embodiments and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the invention as defined in the appended claims.

The invention claimed is:

1. A retainer for mounting a current transformer (CT) onto an electrical enclosure for an electrical panelboard, comprising:
a body having one end portion configured to mount onto a wall of the electrical enclosure and an opposite end portion having a basket for housing a CT, the basket including a flexible clip configured to flex to allow insertion of the CT into the basket or removal of the CT from the basket, and the basket further including a groove or an opening configured to retain a portion of a cable to be monitored by the CT when the monitored cable passes through a center aperture of the CT when housed in the basket.

2. The retainer of claim 1, wherein the one end portion includes an adhesive for attachment of the retainer onto a surface of a wall 140 of the electrical enclosure.

3. The retainer of claim 1, wherein the one end portion includes a snap joint for mounting the one end portion into an opening in a wall of the electrical enclosure, the snap joint comprising a plurality of resilient cantilevers configured to extend through the opening and to engage the wall.

4. The retainer of claim 1, wherein the flexible clip comprises:
a top portion to be arranged above a top of the CT;
a middle portion having a pair of extending arms to be arranged on opposite sides of the CT; and
a bottom portion to be arranged below a bottom of the CT, wherein an end of the top portion or the bottom portion includes a hook configured to engage a side or portion of the CT to retain the CT in the basket.

5. The retainer of claim 4, wherein the top portion includes the groove or opening configured to retain a portion of the cable to be monitored by the CT.

6. The retainer of claim 5, wherein the top portion further includes a wire retainer configured to retain a cable not monitored by the CT.

7. The retainer of claim 4, wherein the bottom portion includes a groove or an opening configured to retain a portion of a cable to be monitored by the CT.

8. The retainer of claim 7, wherein the bottom portion further includes a wire retainer configured to retain a cable not monitored by the CT.

9. The retainer of claim 1, wherein the basket further includes a housing having an aperture configured to receive a portion of the flexible clip, the flexible clip comprising a base portion for supporting the CT and two opposing flexible cantilever arms which are configured to be arranged on opposing sides of the CT and to engage the housing through the aperture.

10. The retainer of claim 9, wherein the aperture comprises a plurality of apertures, each of the apertures configured to receive the flexible clip at a different position in the housing.

11. The retainer of claim 9, wherein the two opposing flexible cantilever arms of the flexible clip each include a finger which snaps into corresponding slots on opposing side walls of the housing, when the flexible clip is engaged to the housing through the aperture.

12. An electrical enclosure for an electrical panelboard comprising:
a wall; and
a retainer for mounting a current transformer (CT) onto the wall, the retainer including a body having one end portion mounted onto the wall and an opposite end portion having a basket for housing the CT, the basket including a flexible clip configured to flex to allow insertion of the CT into the basket or removal of the CT from the basket; and the basket further including a groove or an opening configured to retain a portion of a cable to be monitored by the CT when the monitored cable passes through a center aperture of the CT when housed in the basket.

13. The electrical enclosure of claim 12, wherein the flexible clip comprises:
   a top portion to be arranged above a top of the CT;
   a middle portion having a pair of extending arms to be arranged on opposite sides of the CT; and
   a bottom portion configured to be arranged below a bottom of the CT,
   wherein an end of the top portion or the bottom portion includes a hook configured to engage a side or portion of the CT to retain the CT in the basket.

14. The electrical enclosure of claim 12, wherein the basket further includes a housing having an aperture configured to receive a portion of the flexible clip, the flexible clip comprising a base portion for supporting the CT and two opposing flexible cantilever arms which are configured to be arranged on opposing sides of the CT and to engage the housing through the aperture.

15. The electrical enclosure of claim 14, wherein the aperture comprises a plurality of apertures, each of the apertures configured to receive the flexible clip at a different position in the basket.

16. The electrical enclosure of claim 14, wherein the two opposing flexible cantilever arms of the flexible clip each include a finger which snaps into corresponding slots on opposing side walls of the housing, when the flexible clip is engaged to the housing through the aperture.

* * * * *